United States Patent
Hietmann et al.

(10) Patent No.: US 9,393,687 B2
(45) Date of Patent: Jul. 19, 2016

(54) METHOD FOR PROGRAMMING AN INDUSTRIAL ROBOT AND INDUSTRIAL ROBOT

(71) Applicant: KUKA Laboratories GmbH, Augsburg (DE)

(72) Inventors: Gerhard Hietmann, Herbertshofen (DE); Philipp Wullner, Marsberg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/616,146

(22) Filed: Feb. 6, 2015

(65) Prior Publication Data

US 2015/0217445 A1    Aug. 6, 2015

(30) Foreign Application Priority Data

Feb. 6, 2014    (DE) .......................... 10 2014 202 145

(51) Int. Cl.
*G05B 19/423*    (2006.01)
*B25J 9/00*    (2006.01)
*B25J 9/16*    (2006.01)

(52) U.S. Cl.
CPC .............. *B25J 9/0081* (2013.01); *B25J 9/1656* (2013.01); *G05B 19/423* (2013.01); *G05B 2219/36433* (2013.01); *G05B 2219/39319* (2013.01); *Y10S 901/04* (2013.01)

(58) Field of Classification Search
CPC ..... B25J 9/0081; B25J 9/1656; Y10S 901/04; G05B 2219/39319; G05B 19/423; G05B 2219/36433
See application file for complete search history.

(56) References Cited

U.S. PATENT DOCUMENTS

| | | | |
|---|---|---|---|
| 5,880,956 A | 3/1999 | Graf | |
| 6,285,920 B1 * | 9/2001 | McGee | ................ G05B 19/423 219/125.11 |
| 2012/0239193 A1 | 9/2012 | Mizutani | |

FOREIGN PATENT DOCUMENTS

| | | |
|---|---|---|
| CN | 102689307 A | 9/2012 |
| CN | 103347662 A | 10/2013 |
| CN | 103419198 A | 12/2013 |
| DE | 3211992 A1 | 10/1983 |
| DE | 69622572 T2 | 4/2003 |
| DE | 69735269 T2 | 7/2006 |
| DE | 102008027008 A1 | 12/2009 |
| DE | 102012009010 A1 | 12/2012 |
| EP | 0850730 A1 | 7/1998 |
| JP | 2012232396 A | 11/2012 |

(Continued)

OTHER PUBLICATIONS

German Patent Office; Search Report in German Patent Application No. 10 2014 202 145.6 dated Nov. 17, 2014; 7 pages.

(Continued)

*Primary Examiner* — Yuen Wong
(74) *Attorney, Agent, or Firm* — Wood, Herron & Evans, LLP

(57) ABSTRACT

A method for programming an industrial robot includes moving a manipulator arm of the industrial robot manually (hand guided) into at least one pose in which at least one control variable, which is to be entered in a robot program, is recorded by a control device of the industrial robot and is saved as a parameter of an associated program instruction in the robot program. In another aspect, an industrial robot includes a robot control unit which is designed and/or configured to carry out such a method.

14 Claims, 3 Drawing Sheets

(56) References Cited

FOREIGN PATENT DOCUMENTS

| | | | |
|---|---|---|---|
| WO | 2010069429 | A1 | 6/2010 |
| WO | WO2010088959 | A1 * | 8/2010 |
| WO | 2011018117 | A1 | 2/2011 |

OTHER PUBLICATIONS

Chinese Patent Office; Office Action in Chinese Patent Application No. 201510063407.3 dated Jan. 28, 2016; 14 pages.

European Patent Office, Search Report in European Patent Application No. 15153605.9, dated Jul. 24, 2015, 8 pp.

* cited by examiner

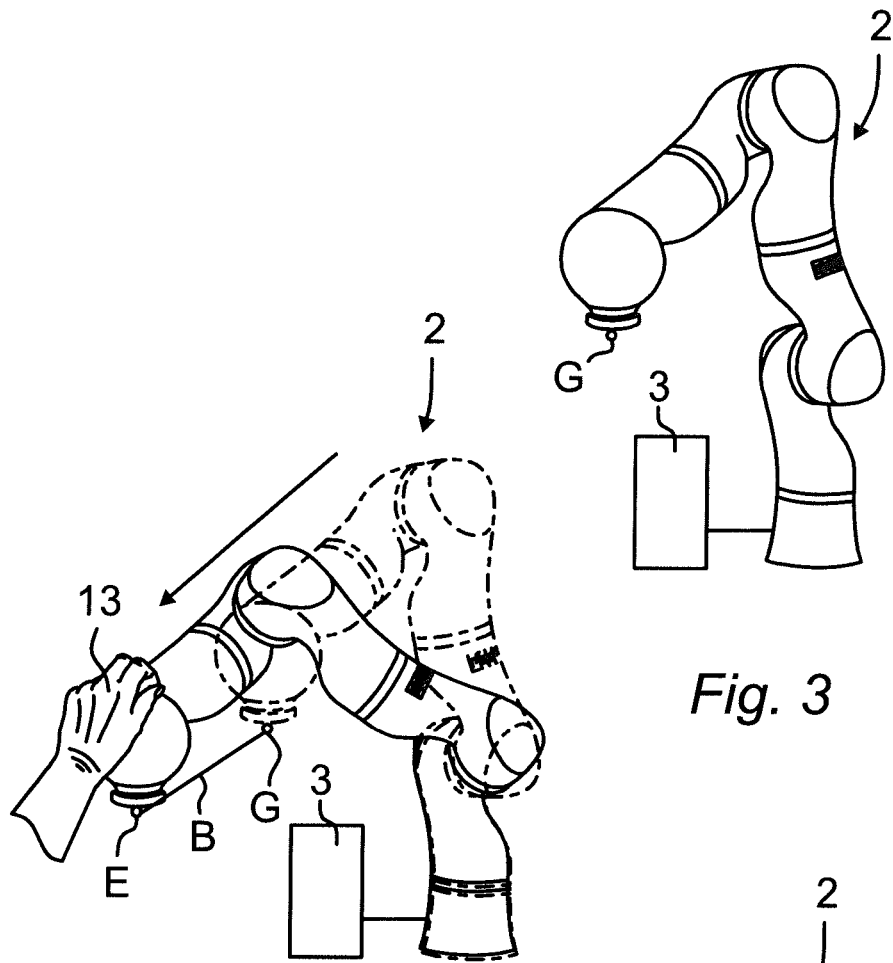
Fig. 3
Fig. 4
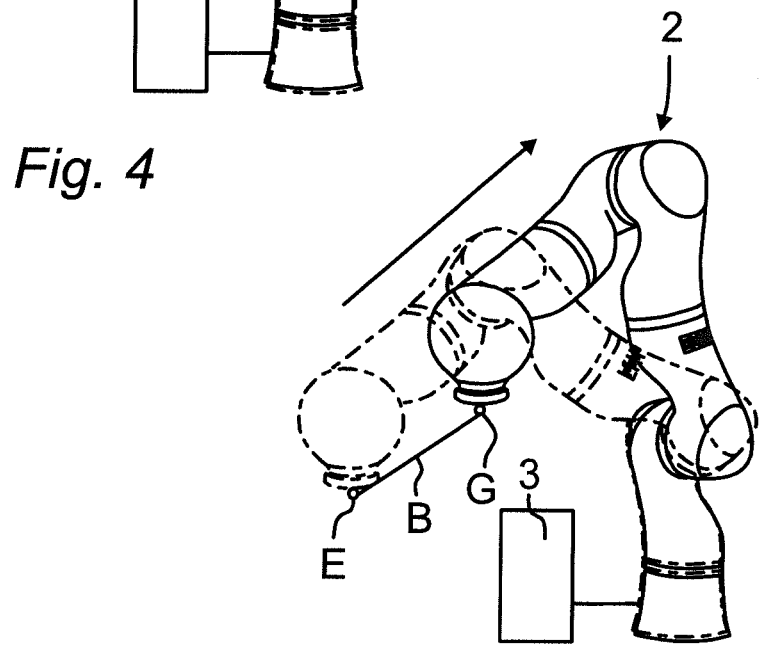
Fig. 5

METHOD FOR PROGRAMMING AN INDUSTRIAL ROBOT AND INDUSTRIAL ROBOT

TECHNICAL FIELD

The invention relates to a method for programming an industrial robot by moving a manipulator arm of the industrial robot manually (hand guided) into at least one pose, in which at least one control variable, which is to be entered in a robot program, is recorded by a control device of the industrial robot and is saved as a parameter of an associated program instruction in the robot program. The invention also relates to an industrial robot, having a robot control unit, which is designed and/or configured to carry out such a method.

BACKGROUND

The WO 2010/069429 A1 discloses a method that is intended for entering instructions into a control unit of a manipulator, in particular, a robot, and that comprises the steps of detecting a first force that acts on the manipulator in a first direction; comparing the detected first force with stored forces, each of which is assigned an instruction; and outputting the instruction, assigned to this saved force, to the control unit of the manipulator, in the event that the detected first force agrees with a saved force.

SUMMARY

The object of the present invention is to provide a method that is intended for programming an industrial robot and that allows the industrial robot to be programmed in a simple and accurate way by moving the manipulator arm manually (hand guided).

This engineering object is achieved by means of a method for programming an industrial robot by moving the manipulator arm of the industrial robot manually (hand guided) into at least one pose, in which at least one control variable, which is to be entered in a robot program, is recorded by a control device of the industrial robot and is saved as a parameter of an associated program instruction in the robot program, said method comprising the steps:

- selecting a type of program instruction, to which associated parameters are to be saved;
- continuously recording and buffering at least one control variable, which is to be entered, in predefined time steps during the manually-guided manipulation of the manipulator arm;
- continuously recording at least one position-related and/or motion-related variable of the respective instantaneous pose of the manipulator arm in predefined time steps during the manually guided manipulation of the manipulator arm;
- comparing the position-related and/or motion-related variables, which are recorded in predefined time steps, with predefined position-related and/or motion-related variables, which represent a termination criterion;
- saving one of the control variables as a parameter of the selected program instruction in the robot program when one of the continuously recorded position-related and/or motion-related variables satisfies the termination criterion.

Manipulator arms with the associated robot control devices, in particular, industrial robots are working machines, which can be provided with tools for automatically handling and/or processing objects and can be programmed in a plurality of axes of motion, for example, in relation to orientation, position and work flow. Industrial robots typically have a manipulator arm comprising a plurality of links, which are connected by joints, and programmable robot controllers (control devices), which automatically control or more specifically regulate the sequences of motion of the manipulator arm during operation. The links are moved by means of drives, in particular, electric drives, which are actuated by the robot control device, in particular in relation to the industrial robot's axes of motion, which represent the degrees of freedom of motion of the joints.

Manipulator arms can comprise, for example, a frame and a carousel, which is mounted relative to the frame in such a way that it can be rotated by means of a joint; and a link arm is swivelably mounted on said carousel by means of another joint. In this case an arm extension can be swivelably mounted on the link arm by means of another joint. At the same time the arm extension carries a robot hand, so that in this respect the arm extension and/or the robot hand can have a plurality of additional joints. A manipulator arm that has a plurality of links that are connected by means of joints can be configured as an articulated robot comprising a plurality of links and joints that are arranged in series one after the other. In particular, the manipulator arm can be designed as a six axis articulated robot.

However, the manipulator arms with associated robot control devices, such as industrial robots, may also be, in particular, so-called light-weight robots, which can be distinguished from conventional industrial robots primarily by the fact that they exhibit a variable that is optimal for man-machine cooperation and at the same time have a relatively high load carrying capacity in relation to their intrinsic weight. In addition, light-weight robots can be operated, in particular, in a force-controlled and/or torque-controlled manner, for example, in a compliance control mode, instead of, in a position-controlled manner, which simplifies, for example, a manual adjustment of the pose of the manipulator arm. In addition, it is also possible to achieve reliable and safe man-machine cooperation in this way, because, for example, unintentional collisions of the manipulator arm with persons can be either prevented or at least minimized in such a way that the persons do not suffer any injury. Such a manipulator arm or more specifically such a light weight robot can usually have more than six degrees of freedom, so that the net result is an over-defined system, which allows the same point in space to be achieved in the same orientation in a plurality of different poses of the manipulator arm. The light weight robot can react to external applications of force in appropriate ways. In order to measure the force, it is possible to use force sensors, which can measure force and torque levels in all three spatial directions. As an alternative or in addition, the external forces can also be estimated without specific sensors, for example, by means of the measured motor currents of the drives at the joints of the light weight robot. It is possible to use, as the control concepts, for example, an indirect force control by modeling the light weight robot as the mechanical resistance (impedance) or a direct force control.

The concept "moving the manipulator arm manually" is understood to mean, in particular, that the instantaneous joint positions of the manipulator arm are changed when an operator of the industrial robot touches the manipulator arm at one or more of its joints and changes, i.e., adjusts the pose of the manipulator arm by, for example, pushing, pulling and/or rotating the grasped link(s). In one embodiment, which is presented as an example of the underlying principle, a handle or at least a section of a handle, can be provided, in particular, can be rigidly mounted on the last link of the manipulator arm in the kinematic chain, i.e., on the manual flange of the manipulator arm. A guidance force can be introduced into the mechanical structure of the manipulator arm by means of said handle or said section of the handle. Such a guidance force, which is applied to the manipulator arm by the operator of the industrial robot, can be directly measured, for example, by means of sensors, in particular, force sensors that are designed and configured specifically for this purpose, or can be indirectly calculated from the measured values at the already existing joint sensors, in particular, force/torque sensors of the manipulator arm or can be indirectly determined from the motor currents of the drives of the joints of the industrial robot. The concept "moving the manipulator arm manually" also includes, inventively, merely holding the manipulator arm in space, so that its instantaneous pose is unchanged. The concept "moving the manipulator arm" is also generally understood to mean handling the manipulator arm, a state that also includes the above-described holding of the manipulator arm in an unmodified pose.

The term "pose of the manipulator arm" is defined very loosely as the sum of all joint positions of the joints of the manipulator arm, which connect the individual links of the manipulator arm in such a way that said individual links can be adjusted. In the narrow sense the term "pose" in a clearly defined system may also be just the position and orientation of a reference point, such as, for example, a tool reference point (tool center point/TCP) of the manipulator arm. The tool reference point can be formed, for example, by a suitable point on a manual flange of the manipulator arm, on which a gripper, a tool or any other device is mounted, in order to be able to move them by adjusting the pose of the manipulator arm in space. As a general principle, the tool reference point can be a virtual spatial point even outside the manipulator arm, which, however, is connected in a geometrically rigid manner to one of the links of the manipulator arm, in particular, the manual flange of the manipulator arm.

A robot program forms a control specification that explains how the control device is supposed to automatically actuate the manipulator arm or more specifically its joints, in order to be able to automatically execute the desired motions and actions of the manipulator arm. For this purpose a robot program includes program instructions, which constitute, for example, specific types of motions. However, a program instruction can also relate only to the setting of a state or a property of the manipulator arm. Each program instruction can be assigned at least one parameter. In the case of a position instruction the at least one parameter can be formed, for example, by the X, Y and Z position values of a tool reference point in the Cartesian space. In other cases the parameter may be, for example, a speed, a maximum acceleration or a compliance value or stiffness value, which also represents a property of the manipulator arm; and the manipulator arm can automatically enter this property in a program-controlled manner, in particular, also over a plurality of support points.

In particular, the programming of robot assembly tasks requires not only the teach-in of poses as the control variables, but also on a large scale the teach-in of other control variables, such as direction, force, torque, axis of rotation, and, furthermore, also sensor signals.

As a general principle, it is known that control variables can be learned (i.e., the control variables can be entered in a robot program that is to be created) by guiding the manipulator arm by hand. For example, in order to learn a point in space, to which a tool reference point of the manipulator arm is to be automatically moved at a later date, the manipulator arm is adjusted by hand, for example in a gravitational compensation control mode in such a way that the tool reference point lies at the desired point in space (i.e., the point that is to be saved in the robot program). In order to be able to save now the desired point in the robot program, one generally depresses a confirmation button, which instructs the control device to save the currently set position of the tool reference point as a parameter of an associated program instruction in the robot program.

In a stiffness control mode or compliance control mode of the industrial robot, the forces, torques, poses and directions can be learned. Since in this mode the manipulator arm is pulled back to a reference point by an actuated spring action, the manipulator arm has to be held at the desired deflection point (i.e., the deflection point that is to be programmed), until the currently set point is saved as a parameter of an associated program instruction in the robot program by depressing the confirmation button by hand. However, holding the manipulator arm at the desired deflection point for the sake of sufficient accuracy during the recording of the control variables to be saved is often guaranteed only if the manipulator arm is held with two hands.

In a gravitational compensation control mode the manipulator arm stays in the pose, in which it was positioned by the user, without any external application of force. In this mode poses and directions, which can be defined by two different poses, can be learned. In practice, however, errors in the model, such as, for example, incorrect load data, can also result in the manipulator arm drifting out of its desired position in an undesired manner. Even in such a case, in order to enter a point (i.e., in order to program a point, in particular, in order to save a point), the manipulator arm has to be held in the desired pose. In order to achieve a certain degree of precision during the positioning process, two hands of the user are necessary for this purpose.

In both the gravitational compensation control mode and also in the stiffness control mode, both hands of a person are necessary to learn the aforementioned variables. In this case a third hand is missing in order to depress a confirmation button by hand (i.e., to communicate to the control device the signal to save now the desired control variables of the current situation, for example, the pose, the application of a force and/or a torque or other sensor signals, in the robot program).

In this case a motion-based gesture recognition, as described, for example, in the WO 2010/069429A1, is not possible, because the objective that is to be achieved is to learn (i.e., to save in the robot program) a specific pose, force or torque; and, hence, the manipulator arm may no longer be moved or should no longer be moved.

Therefore, the basic idea of the invention is that even during the manipulation of the manipulator arm, hence, already prior to a desired entering (touch-up) or more specifically already prior to saving the control variable to be entered, the control device continuously monitors and also tentatively logs this control variable, until there is a representative event that can be a characteristic motion of the manipulator arm or a characteristic standstill of the manipulator arm, which is automatically recognized by the control device as a signal to enter now the desired control variable. The representative event, in particular, the characteristic motion of the manipulator arm or the characteristic standstill is also interpreted as a consent action, which automatically causes the control device to save the desired control variable as a parameter of a previously selected program instruction in the robot program.

Such an inventive programming method starts, first of all, with the selection of a type of program instruction, to which associated parameters are to be saved. Such a selection can be performed, for example, before a user (i.e., the robot programmer) moves the manipulator arm manually (by hand), for example, by selecting a desired type of program instruction by means of push buttons, a menu and/or a display on a hand-held input device associated with the control device of the industrial robot. However, the type of program instruction to be selected can also be selected automatically by the control device, for example, on the basis of an interpreted line of code that is already present in the robot program prior to the start of the inventive programming method. The type of program instruction to be selected may be a motion instruction, in particular, a point-to-point instruction, a linear instruction or a spline instruction and/or a parameterization instruction, in particular, of the compliance or the stiffness, of a robot programming language that actuates the control device.

After the type of program instruction has been selected, the continuous recording and buffering of the at least one control variable to be entered starts in predefined time steps. The time steps may be, for example, the interpolation cycles that are already used by the control device itself and as such are well-known. In the meantime the manipulator arm is guided manually, i.e., manipulated by hand, and is actuated accordingly by means of the control device, in order to move itself.

In parallel to the preceding step, the invention provides that a continuous recording of at least one position-related and/or motion-related variable of the respective instantaneous pose of the manipulator arm takes place in predefined time steps during the manually guided manipulation of the manipulator arm. Even in this case the time steps may be, for example, the interpolation cycles that are already used by the control device itself and as such are well-known. Owing to the continuous recording of at least one position-related and/or motion-related variable, the control device can automatically recognize a representative event that may be a characteristic motion of the manipulator arm or a characteristic standstill of the manipulator arm, which is automatically interpreted by the control device as a signal to enter now the desired control variable.

An automatic recognition of the representative event occurs according to the invention when a comparison of the position-related and/or motion-related variables, which are recorded in predefined time steps, with predefined position-related and/or motion-related variables, which constitute a termination criterion, is automatically carried out. The termination criterion may be, for example, a stationary state of the manipulator arm over a certain period of time.

As soon as the representative event is automatically recognized by the control device, the control variable is saved as a parameter of the selected program instruction in the robot program when one of the continuously recorded position-related and/or motion-related variables satisfies the termination criterion.

In a first variant of the method it is possible to provide as additional steps that
  the manipulator arm is operated by the control device in an active compliance control mode;
  the continuous recording and buffering of the at least one control variable, which is to be entered, is performed by means of the control device when the manipulator arm is moved manually out of a base pose into a record pose; and
  the saving of the control variable as a parameter of the selected program instruction in the robot program takes place, when owing to the comparison of the recorded position-related and/or motion-related variables with the predefined position-related and/or motion-related variables, the control device automatically recognizes that due to the compliance control mode the manipulator arm has been moved back out of the record pose into the base pose.

In this first variant of the method, the control device may automatically recognize a representative event that is a characteristic motion of the manipulator arm.

In this case the representative event may also be a release event.

For example, in an active compliance or stiffness control mode the manipulator arm can be deflected out of a base pose, in order to learn (i.e., to enter in a robot program) a control variable, for example, a pose, a direction, a force or a torque. When the desired control variable is set in a pose of the manipulator arm that is moved out of the base pose and is, thus, spring loaded, the manipulator arm is released. Owing to the compliance or stiffness control mode the manipulator arm swings back again into the base pose immediately after having been released. This event of releasing the deflected manipulator arm, identified, for example, by the sudden change in the measured torque levels of the joints or the measured angular values of the joints of the manipulator arm, is used as the position-related and/or motion-related variable, in order to record the desired control variable at this instant. At the same time it is possible that upon activation of the compliance or stiffness control mode the desired control variable is recorded cyclically; and when the release event occurs chronologically before the detected event, a time step, in which the change in the variable to be measured was under a certain threshold, is sought, for example, is sought after a brief rest period, and then the average value is formed by means of a plurality of control variables that had already been recorded continuously during the brief rest period.

In these embodiments the actuation of the drives of the industrial robot can be carried out by means of impedance control or admittance control. The control device may also be configured to generate the compliance or stiffness control mode of the manipulator by means of impedance control or admittance control.

In contrast to an admittance control, an impedance control is based on an existing torque control on the joint level. The deviation of the actual position and orientation from a defined desired position and orientation is measured; and a desired generalized force, or more specifically the force levels and torque levels, is determined as a function of the desired dynamic behavior. This force can be mapped to corresponding joint torques by means of the known kinematics of the manipulator. Then the torque levels may be set by means of the underlying torque control system.

An admittance control is based on an existing position control of the manipulator on the joint level. In this case the generalized forces, acting on the manipulator from the outside, are measured. Based on these forces, a movement of the manipulator that corresponds to the desired dynamic behavior is determined; and this movement of the manipulator is sent to the manipulator by way of an inverse kinematics and the underlying position control system.

In an alternative or additional second variant of the method it is possible to provide as additional steps that
  the manipulator arm is operated by the control device in an active compliance control mode or in a gravitational compensation control mode;
  the continuous recording of the at least one position-related and/or motion-related variable of the respective instantaneous pose of the manipulator arm allows the control device to automatically recognize a standstill of the manipulator arm; and the comparison of the position-related and/or motion-related variables, which are recorded in predefined time steps, with a predefined minimum standstill period of the manipulator arm, which constitutes the termination criterion, upon reaching the minimum standstill period allows the control device to automatically save the control variable as a parameter of the selected program instruction in the robot program.

In this second variant of the method, the control device may automatically recognize a representative event that is a characteristic standstill of the manipulator arm.

In this respect the representative event may also be a rest event, i.e., a standstill event.

In an active compliance or stiffness control mode or in a gravitational compensation control mode the manipulator arm is deflected, in order to learn, for example, a pose.

As soon as the manipulator arm has no longer been moved for a definable period, hence, is at rest, i.e., the actual angle of the joint can only change in a parameterizable angular range, this state is recognized as an event for recording control variables, like the pose, forces, torques, sensor signals, etc.

The event itself and a period of time just prior to the event can be signaled to the user by a variety of methods, such as, for example, by means of an acoustical signal, a visual signal, such as an LED, or by means of vibrations. Signaling the period of time just before the occurrence of the event can give the user the chance to prevent the current control variable from being saved by moving the manipulator arm, in the case that the desired state has not been reached yet.

For example, when the start of a rest period is recognized, an acoustical signal could resound at a defined pulse frequency. As the manipulator arm continues to remain at rest, the pulse frequency increases until it becomes a continuous tone; and then the set control variable is entered, i.e., saved.

In this case, too, from the control variable that is to be recorded, an average value can be computed over the time during which the manipulator arm was at rest.

If the functionality is not turned off; and then the manipulator arm is moved again, the event monitoring can be, for example, reactivated. This can be used, for example, to enter anew a control variable that had been recorded, i.e., to overwrite, or in order to enter an additional control variable at a different point, thus, for example, to enter an entire series of multiple points, to which the manipulator arm is to be moved.

When the programming of an industrial robot is guided manually (by hand), the above described inventive methods make it possible to dispense with a number of operator actions, a saving that is particularly advantageous, when both hands are required on the manipulator arm or its flange tool for a precise position input or for a force/torque input.

In all embodiments of the method the at least one position-related and/or motion-related variable of the manipulator arm may be a Cartesian or joint-specific position and/or orientation value of the manipulator arm.

In all embodiments of the method the at least one position-related and/or motion-related variable of the manipulator arm may be a speed value and/or an acceleration value that is and/or are derived from a Cartesian or joint-specific position and/or orientation value of the manipulator arm.

As an alternative or in addition, the at least one position-related and/or motion-related variable of the manipulator arm may be a speed value and/or an acceleration value that is/are measured at the manipulator arm.

In general, it is possible to save from the continuously recorded and buffered control variables a control variable as a parameter of the selected program instruction in the robot program, where this saved control variable is in terms of time a predefined number of time steps before the time at which the termination criterion is fulfilled.

Any type of program instruction can be assigned its own specific number of time steps; and based on the selection of the type of program instruction, the number of time steps that are assigned to this program instruction can be used to select the control variable, which is to be saved as a parameter, from the continuously recorded and buffered control variables.

The control variable to be entered may be a position, an orientation, a speed, an acceleration and/or a trajectory of a tool reference point or of at least one joint of the manipulator arm, or a force that is applied, a torque that is applied, a compliance and/or a stiffness of the manipulator arm or a variable of an external sensor, such as, for example, the variable of a distance measuring sensor.

The type of program instruction that is to be selected may be a motion instruction, in particular, a point-to-point instruction, a linear instruction, a spline instruction or a higher level instruction, such as, for example, "move until contact", "put pin in hole", and/or a parameterization instruction, in particular, of the compliance or the stiffness, of a robot programming language actuating the control device. A "higher level instruction" may be construed very loosely to mean a type of instruction of a robot programming language that may be regarded as an instruction in a high level language, where this instruction has an instruction content that goes beyond the basic types of instructions of the respective robot programming language.

In addition, the object of the present invention is also achieved by an industrial robot having a robot control device, which is designed and/or configured to execute a robot program, as well as having a manipulator arm with at least three joints, which are automated according to the robot program and/or are automatically adjusted in a manual operation, wherein the robot control device is designed and/or configured to carry out a method, as described.

A concrete exemplary embodiment of an industrial robot, which can be operated according to the inventive method, is explained in more detail in the following description with reference to the accompanying figures. Concrete features of this exemplary embodiment, which are presented as examples, may represent either individually or in any combination, the general features of the invention, irrespective of the concrete correlation in which they are mentioned.

BRIEF DESCRIPTION OF THE DRAWINGS

The drawings show in:

FIG. 3 a schematic representation of the manipulator arm in a base pose, from which an exemplary direction of motion is to be learned.

FIG. 4 a schematic representation of the manipulator arm, according to FIG. 3, in a manually deflected record pose, which defines a direction of motion in conjunction with the base pose.

FIG. 5 a schematic representation of the manipulator arm, which upon release is automatically put back again into the base pose, in which the direction of motion is learned.

DETAILED DESCRIPTION

Figure 1:
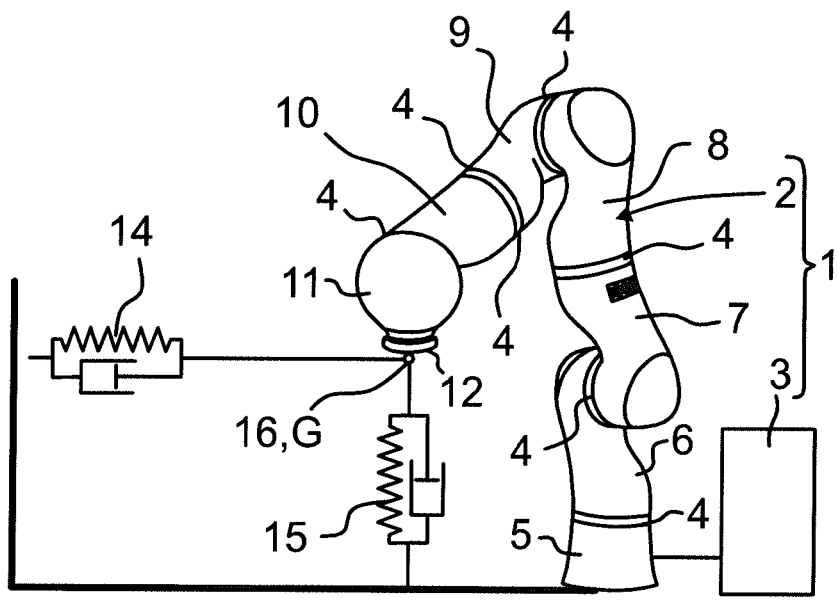
FIG. 1 a schematic representation of an industrial robot, which is constructed as a light-weight robot, with a robot control device, shown in schematic form, and a manipulator arm in a base pose.
Figure 2:
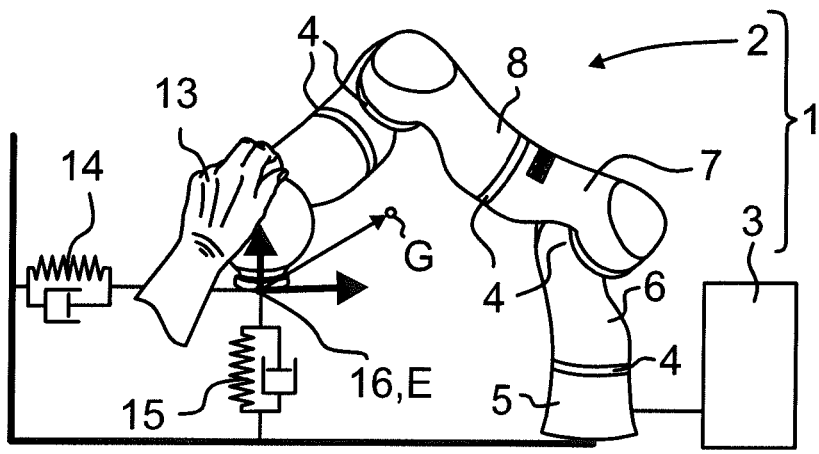
FIG. 2 a schematic representation of the industrial robot, according to FIG. 1, with the robot control device, shown in schematic form, and the manipulator arm in a manually deflected record pose.

FIG. 1 and FIG. 2 show an industrial robot 1 in an exemplary embodiment as a so-called light-weight robot, which has a manipulator arm 2 and a robot control device 3. In the case of the present embodiment that is presented as an example, the manipulator arm 2 comprises a plurality of links 5 to 12, which are arranged in series and are connected to each other by means of joints 4 in such a way that said links can be rotated.

The robot control device 3 of the industrial robot 1 is designed and/or configured to execute a robot program, by means of which the joints 4 of the manipulator arm 2 can be automated according to the robot program and/or can be automatically adjusted or more specifically can be rotated in a manual operation. For this purpose the robot control device 3 is connected to actuable electric drives, which are designed to adjust the joints 4 of the industrial robot 1.

The robot control device 3 is designed and/or configured to carry out a method for programming the industrial robot 1 by moving the manipulator arm 2 manually (hand guided), which is described in more detail below by means of concrete exemplary embodiments.

Forces, torques, poses and directions can be learned in a stiffness control mode or compliance control mode of the industrial robot 1. Since in this mode the manipulator arm 2 is pulled back to a reference point (base pose G) by means of an actuated spring action, the manipulator arm 2 has to be held by at least one hand 13 of a user at the desired deflection point (record pose E), i.e., the deflection point to be programmed. The existing spring action in two spatial directions is shown by the spring-damper symbols 14 and 15 (shown in schematic form) in the plane in FIG. 1 and FIG. 2.

According to FIG. 1, the manipulator arm 2 is driven, first of all, by the control device 3 in an active compliance control mode. At the same time a continuous recording and buffering of the at least one control variable to be entered, in this case the pose of the manipulator arm 2, according to FIG. 2, takes place by means of the control device 3 when the manipulator arm 2 is moved, as shown in FIG. 2, manually by the hand 13 out of a base pose G into a record pose E. The control variable (that is, the values of the angles of all joints 4 of the manipulator arm 2 or the Cartesian position values of a tool reference point 16 of the manipulator arm 2, where said Cartesian position values are transformed from the values of the angles) is saved as a parameter of the selected program instruction in the robot program when, owing to the comparison of the recorded position-related and/or motion-related variables with the predefined position-related and/or motion-related variables, the control device 3 automatically recognizes that, due to the compliance control mode, the manipulator arm 2 has been moved back out of the record pose E into the base pose G.

In this first variant of the method the control device 3 can automatically recognize a representative event, which is the return movement of the manipulator arm 2 out of the record pose E, according to FIG. 2, back into the base pose G, according to FIG. 1.

The representative event can also be a release event, when the user takes his hand 13 away from the manipulator arm 2; and the manipulator arm 2 returns again into the base pose of FIG. 1 owing to its spring properties (spring-damper symbols 14 and 15).

For example, in an active compliance or stiffness control mode the manipulator arm 2 can be deflected out of the base pose G, according to FIG. 1, in order to learn (i.e., to enter in the robot program) a control variable, for example, a pose, a direction, a force or a torque. When the desired control variable is set in a record pose E of the manipulator arm 2 according to FIG. 2, where this manipulator arm has been deflected out of the base pose G and, thus, is spring loaded, the manipulator arm 2 is released. Owing to the compliance or stiffness control mode the manipulator arm 2 swings back again into the base pose G, according to FIG. 1, immediately after having been released. This event of releasing the deflected manipulator arm 2, identified, for example, by the sudden change in the measured torque levels of the joint or the measured angular values of the joint of the manipulator arm 2, is used as the position-related and/or motion-related variable, in order to record the desired control variable at this instant. At the same time it is possible that upon activation of the compliance or stiffness control mode the desired control variable is recorded cyclically; and when the release event occurs chronologically before the detected event, a time step, in which the change in the variable to be measured was under a certain threshold, is sought, for example, is sought after a brief rest period, and then the average value is formed by means of a plurality of control variables that had already been recorded continuously during the brief rest period.

FIGS. 3 to 5 show an additional second variant of the method. In FIG. 3 the manipulator arm 2 is again in the base pose G. The manipulator arm 2 is operated by the control device 3 in an active compliance control mode or in a gravitational compensation control mode. The continuous recording of the at least one position-related and/or motion-related variable of the respective instantaneous pose of the manipulator arm 2 allows the control device 3 to automatically recognize a standstill of the manipulator arm 2 in the deflected record pose E, according to FIG. 4. The comparison of the position-related and/or motion-related variables, which are recorded in predefined time steps, with a predefined minimum standstill period of the manipulator arm, which constitutes the termination criterion, upon reaching the minimum standstill period allows the control device 3 to automatically save the control variable as a parameter of the selected program instruction in the robot program.

In this variant of the method the control device 3 may automatically recognize a representative event that is a characteristic standstill of the manipulator arm 2. In this respect the representative event may be a rest event, i.e., a standstill event.

In an active compliance or stiffness control mode or in a gravitational compensation control mode the manipulator arm 2, according to FIG. 4, is deflected, in order to learn, for example, a direction.

As soon as the manipulator arm has no longer been moved for a definable period, hence, is at rest, i.e., the actual angle of the joint can only change in a parameterizable angular range, this state is recognized as an event for recording the record pose E. In this variant, however, it is not a spatial point, but rather a direction of motion B that is to be learned. Therefore, starting from the base pose G, according to FIG. 3, the manipulator arm 2 is moved by a user by means of his hand 13 in a desired direction of motion B out of the base pose G, according to FIG. 3, into the resulting record pose E, according to FIG. 4. Upon the release of the manipulator arm 2, the manipulator arm 2 moves, as shown in FIG. 5, back again into its base pose, according to FIG. 3. In the case of the present exemplary embodiment such an automatic retraction into the starting position by means of such a spring action takes place only in an active stiffness control mode, but not in a gravitational compensation mode.

The learning of a direction of motion may be necessary, in order, for example, to perform a motion later or to exert a force in this direction later in the automatic programming mode.

At the instant that the manipulator arm 2 is released, its spring property relaxes, as shown in FIG. 5; and immediately this release event is automatically recognized by the control device 3 and records the release pose according to FIG. 4. The direction vector of the direction of motion B is defined together with the starting point in the base pose G. The manipulator arm 2 returns to the previous base pose of FIG. 3 owing to the spring action; and the stiffness mode can be turned off.

Figure 6:
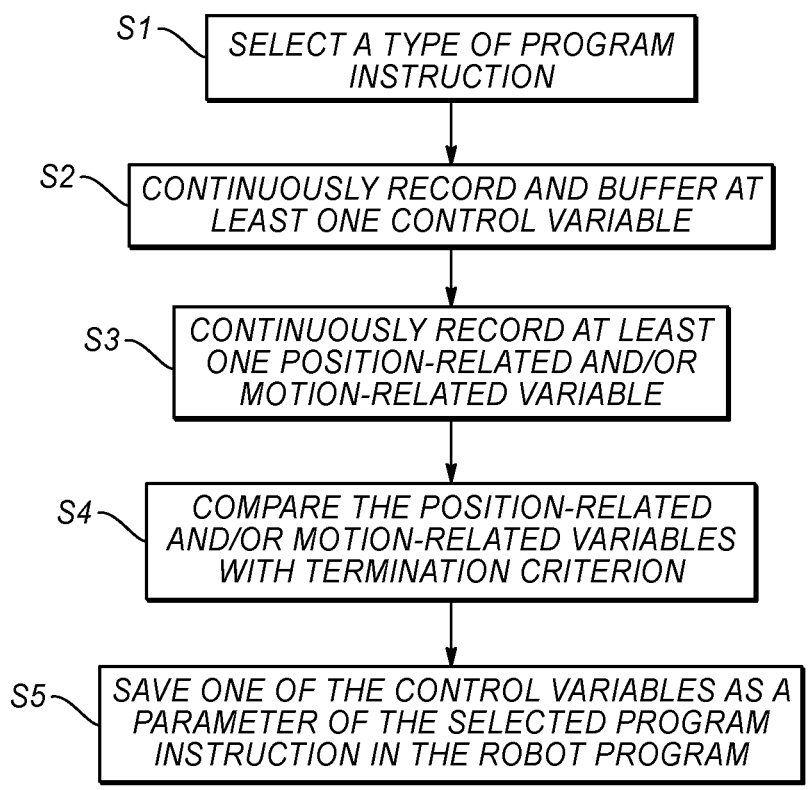
FIG. 6 a schematic flowchart of an inventive method with the process steps S1 to S5.

FIG. 6 shows in schematic form a sequence of the inventive basic method for programming the industrial robot 1 by moving the manipulator arm 2 manually (hand guided) into at least one pose, in which at least one control variable, which is to be entered in a robot program, is recorded by a control device 3 of the industrial robot 1 and is saved as a parameter of an associated program instruction in the robot program.

In the process step S1 a type of program instruction, to which associated parameters are to be saved, is selected.

In the process step S2 a continuous recording and buffering of the at least one control variable, which is to be entered, take place in predefined time steps during the manually guided manipulation of the manipulator arm (hand guided).

In the process step S3 a continuous recording of at least one position-related and/or motion-related variable of the respective instantaneous pose of the manipulator arm takes place in predefined time steps during the manually guided manipulation of the manipulator arm (hand guided).

In the process step S4 a comparison of the position-related and/or motion-related variables, which are recorded in predefined time steps, with predefined position-related and/or motion-related variables, which represent a termination criterion, takes place.

In the process step S5 a saving of one of the control variables as a parameter of the selected program instruction in the robot program takes place when one of the continuously recorded position-related and/or motion-related variables satisfies the termination criterion.

What is claimed is:

1. A method for programming an industrial robot with a control device, comprising:
    actuating drives of a manipulator arm of the industrial robot with the control device to facilitate manual movement of the manipulator arm;
    manually moving and guiding the manipulator arm of the industrial robot by touching contact by an operator with the manipulator arm into at least one pose;
    selecting a program instruction from a plurality of available program instructions, to which parameters are to be saved;
    continuously recording and buffering with the control device at least one control variable, which is to be entered in a robot program, in predefined time steps during the manually guided movement of the manipulator arm;
    continuously recording with the control device at least one position-related variable and/or at least one motion-related variable of respective instantaneous poses of the manipulator arm in predefined time steps during the manually guided movement of the manipulator arm;
    comparing the position-related and/or motion-related variables, which are recorded in predefined time steps, with predefined position-related and/or motion-related variables, which represent a termination criterion;
    wherein the termination criterion is a characteristic motion of the manipulator arm or a characteristic standstill of the manipulator arm that is interpreted by the control device as a command to enter the control variable as a parameter of the selected program instruction; and
    saving one of the control variables as a parameter of the selected program instruction in the robot program, when one of the continuously recorded position-related and/or motion-related variables satisfies the termination criterion.

2. The method of claim 1, wherein:
    the manipulator arm is operated by the control device in an active compliance control mode;
    the continuous recording and buffering of the at least one control variable, which is to be entered, are performed by the control device when the manipulator arm is moved and guided manually by the operator out of a base pose into a record pose; and
    the saving of the control variable as a parameter of the selected program instruction in the robot program takes place when, based on the comparison of the recorded position-related and/or motion-related variables with the predefined position-related and/or motion-related variables, the control device automatically recognizes that, due to the active compliance control mode, the manipulator arm has been moved back out of the record pose into the base pose.

3. The method of claim 1, wherein:
    the manipulator arm is operated by the control device in an active compliance control mode or in a gravitational compensation control mode;
    the continuous recording of the at least one position-related and/or motion-related variable of the respective instantaneous pose of the manipulator arm allows the control device to automatically recognize a standstill of the manipulator arm; and
    the comparison of the position-related and/or motion-related variables, which are recorded in predefined time steps, with a predefined minimum standstill period of the manipulator arm, which constitutes the termination criterion, upon reaching the minimum standstill period allows the control device to automatically save the control variable as a parameter of the selected program instruction in the robot program.

4. The method of claim 1, wherein the at least one position-related and/or motion-related variable of the manipulator arm is a Cartesian or joint-specific position and/or orientation value of the manipulator arm.

5. The method of claim 1, wherein the at least one position-related and/or motion-related variable of the manipulator arm is a speed and/or acceleration value that is/are derived from a Cartesian or joint-specific position and/or orientation value of the manipulator arm.

6. The method of claim 1, wherein the at least one position-related and/or motion-related variable of the manipulator arm is a speed and/or acceleration value that is/are measured at the manipulator arm.

7. The method of claim 1, wherein from the continuously recorded and buffered control variables a control variable is saved as a parameter of the selected program instruction in the robot program, where the saved control variable is, in terms of time, a predefined number of time steps before the time at which the termination criterion is satisfied.

8. The method of claim 7, wherein any program instruction is assigned a specific number of time steps; and based on the selection of the program instruction, the number of time steps that are assigned to this program instruction is used to select the control variable, which is to be saved as a parameter, from the continuously recorded and buffered control variables.

9. The method of claim 1, wherein the control variable to be entered is:
- at least one of a position, an orientation, a speed, an acceleration and/or a trajectory of a tool reference point or of at least one joint of the manipulator arm;
- at least one of a force that is applied, a torque that is applied, or at least one of a compliance or a stiffness of the manipulator arm; or
- a variable of an external sensor.

10. The method of claim 1, wherein the type of program instruction that is to be selected is at least one of:
- a motion instruction;
- a parameterization instruction; or
- a higher level instruction of a robot programming language actuating the control device.

11. The method of claim 10, wherein the motion instruction is one of a point-to-point instruction, a linear instruction, or a spline instruction.

12. The method of claim 10, wherein the parameterization instruction is a parameterization instruction of one of a compliance or a stiffness of the manipulator arm.

13. The method of claim 10, wherein the higher level instruction is an instruction to move until contact or an instruction to put a pin in hole.

14. An industrial robot comprising
- a manipulator arm and a robot control device,
- wherein the manipulator arm includes at least three joints that are manually moved and guided by touching contact with the manipulator arm by an operator into at least one pose,
- the robot control device including a non-transitory computer readable storage medium including program code that, when executed by the robot control device, causes the robot control device to:
- actuate drives of the manipulator arm of the industrial robot to facilitate manual movement of the manipulator arm;
- continuously record and buffer at least one control variable, which is to be entered into a robot program, in predefined time steps during the manually guided movement of the manipulator arm;
- continuously record at least one position-related and/or motion-related variable of respective instantaneous poses of the manipulator arm in the predefined time steps during the manually guided movement of the manipulator arm;
- compare the position-related and/or motion-related variables, which are recorded in the predefined time steps, with predefined position-related and/or motion-related variables, which represent a termination criterion;
- wherein the termination criterion is a characteristic motion of the manipulator arm or a characteristic standstill of the manipulator arm that is interpreted by the control device as a command to enter the control variable as a parameter of the selected program instruction; and
- save one of the control variables as a parameter of the selected program instruction in the robot program, when one of the continuously recorded position-related and/or motion-related variables satisfies the termination criterion.

* * * * *